J. B. BAUGH.
Dies for Welding Links.
No. 150,221. Patented April 28, 1874.
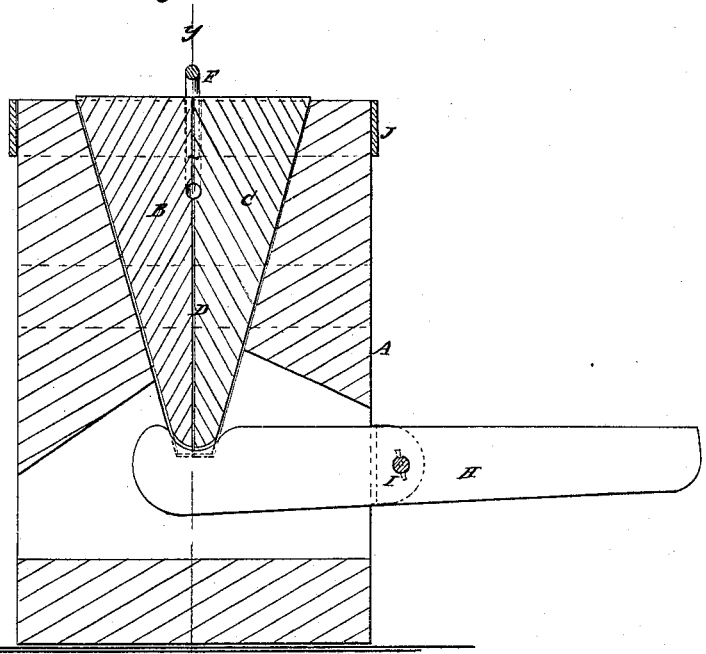
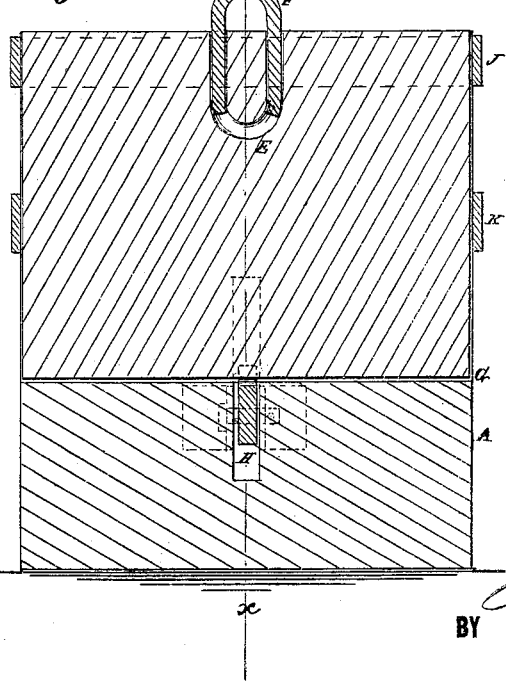
WITNESSES:
INVENTOR:
J. B. Baugh
BY
ATTORNEYS.

UNITED STATES PATENT OFFICE.

JOHN B. BAUGH, OF DETROIT, MICHIGAN.

IMPROVEMENT IN DIES FOR WELDING LINKS.

Specification forming part of Letters Patent No. 150,221, dated April 28, 1874; application filed March 14, 1874.

*To all whom it may concern:*

Be it known that I, JOHN B. BAUGH, of Detroit, in the county of Wayne and State of Michigan, have invented a new and useful Improvement in Apparatus for Welding Links, of which the following is a specification:

The object of this invention is to provide convenient and efficient means for welding links, more especially designed for welding links used for coupling cars on railroads, but applicable to links for chains of every description; and consists of a bed-die and of two wedge-shaped link-dies, which latter work in the bed-die and are raised therefrom by a lever, the construction being hereinafter more fully described.

In the accompanying drawing, Figure 1 is a vertical section of Fig. 2 on the line $x\ x$. Fig. 2 is a vertical section of Fig. 1 taken on the line $y\ y$.

Similar letters of reference indicate corresponding parts.

A is the bed, which rests upon the bed-block or foundation. Through this block A is cut a V-shaped opening, in which are dropped the two wedge-shaped pieces B and C. These pieces fit the opening in the block A, as seen in Fig. 1, the dividing-line D between them being vertical, each portion containing half of the link-die E. F represents the link to be welded. The link is formed of a piece of metal of sufficient length for the purpose bent or turned, as seen in the drawing. When the two wedges are placed together, as seen in Fig. 1, the half-formed link is dropped into the link-die, as seen in Fig. 2, with its ends at a welding-heat, when a smart blow from a power-hammer drives the ends together and welds them, the link being thus perfectly formed and completed in an instant. The wedges B C, being in this operation driven downward in the V-shaped opening, are pressed together instead of being forced asunder, so that the link must take the exact form of the link-die E. G is a narrow space between the bottom of the V-shaped opening and the wedges, which allows of a slight downward movement of the latter. H is a lever beneath the wedges B C. I is the fulcrum. The link is removed by means of this lever, which throws up the wedges and allows the link to be removed. The fulcrum-pin of the lever is supported by ears, (seen in dotted lines in Fig. 1,) which are fastened by screws or rivets to the bed A. Around the top of this bed is a strong band, J, which not only strengthens the bed, but it guides the wedges, so that the two half-grooves E will always correspond with each other and form the link-die when wedges are placed in the opening. K is another band near the middle of the bed for the same purpose. The face of the steam-hammer which strikes the link in the operation of welding has an orifice which receives the top part of the link and thereby keeps the link in place when the welding-blow is struck.

By this apparatus the operation of welding links for car-coupling and for other purposes is greatly facilitated; in fact, not one-fourth the time consumed by the old method is required, while the weld is equally strong, and the welded end, being formed in a die, is perfect.

Having thus described my invention, I claim as new and desire to secure by Letters Patent—

The combination of the wedge-shaped dies B and C, having grooves E, with the bed A and lever H, substantially as and for the purpose described.

JOHN B. BAUGH.

Witnesses:
   T. B. MOSHER,
   ALEX. F. ROBERTS.